(12) United States Patent  
Cai et al.

(10) Patent No.: US 9,953,458 B2  
(45) Date of Patent: Apr. 24, 2018

(54) METHOD AND APPARATUS FOR GENERATING SHAPE DESCRIPTOR OF A MODEL

(75) Inventors: Kangying Cai, Beijing (CN); Wei Liang Meng, Beijing (CN); Tao Luo, Beijing (CN)

(73) Assignee: THOMPSON LICENSING SA, Issy les Moulineaux (FR)

( * ) Notice: Subject to any disclaimer, the term of this patent is extended or adjusted under 35 U.S.C. 154(b) by 87 days.

(21) Appl. No.: 14/402,186

(22) PCT Filed: May 22, 2012

(86) PCT No.: PCT/CN2012/075882  
§ 371 (c)(1),  
(2), (4) Date: Nov. 19, 2014

(87) PCT Pub. No.: WO2013/173974  
PCT Pub. Date: Nov. 28, 2013

(65) Prior Publication Data  
US 2015/0103074 A1   Apr. 16, 2015

(51) Int. Cl.  
*G06T 17/00* (2006.01)  
*G06T 17/30* (2006.01)  
*G06K 9/48* (2006.01)  
*G06K 9/00* (2006.01)

(52) U.S. Cl.  
CPC .......... *G06T 17/00* (2013.01); *G06K 9/00201* (2013.01); *G06K 9/48* (2013.01); *G06T 17/30* (2013.01)

(58) Field of Classification Search  
CPC .................................. G06K 9/00201–9/00214  
See application file for complete search history.

(56) References Cited

U.S. PATENT DOCUMENTS 6,326,964 B1   12/2001   Snyder et al.  
6,429,877 B1 *   8/2002   Stroyan ................ G06T 15/503  
                                                                345/589

(Continued)

FOREIGN PATENT DOCUMENTS

CN   101140623   3/2008  
CN   101799865   8/2010  
(Continued)

OTHER PUBLICATIONS

Kazhdan, Michael, Thomas Funkhouser, and Szymon Rusinkiewicz. "Rotation invariant spherical harmonic representation of 3 d shape descriptors." Symposium on geometry processing. vol. 6. 2003.*

(Continued)

*Primary Examiner* — Daniel Hajnik  
(74) *Attorney, Agent, or Firm* — Tutunjian & Bitetto, P.C.

(57) ABSTRACT

The invention provides a method for generating an n dimensional vector as a shape descriptor of a model, and corresponding apparatus and shape descriptor. The method comprises: determining a type element of the vector to describe the basic shape of the model; and calculating n−1 metric elements of the vector, each of which represents the percentage of all of a feature of the model falling into one of n−1 layers divided as a function of the type element.

10 Claims, 5 Drawing Sheets

(a)

(b)

(c)

(56) References Cited

U.S. PATENT DOCUMENTS

| | | | |
|---|---|---|---|
| 2006/0114252 A1* | 6/2006 | Ramani | G06F 17/30277 345/419 |
| 2007/0052706 A1 | 3/2007 | Martin | |
| 2007/0229503 A1* | 10/2007 | Witzel | G06T 15/503 345/428 |
| 2008/0269942 A1 | 10/2008 | Free | |
| 2009/0157649 A1* | 6/2009 | Papadakis | G06F 17/30259 |
| 2011/0098571 A1* | 4/2011 | Medlin | A61B 8/00 600/445 |
| 2011/0304628 A1* | 12/2011 | Fu | G06K 9/00201 345/441 |
| 2012/0093360 A1* | 4/2012 | Subramanian | G06K 9/00201 382/103 |
| 2012/0106858 A1 | 5/2012 | Cai et al. | |

FOREIGN PATENT DOCUMENTS

| | | |
|---|---|---|
| CN | 101923646 | 12/2010 |
| JP | H10320583 | 12/1998 |
| JP | 2000132710 | 5/2000 |
| WO | WO9524016 | 9/1995 |
| WO | WO2005076196 | 8/2005 |
| WO | WO2012000132 | 1/2012 |
| WO | WO2013113170 | 8/2013 |

OTHER PUBLICATIONS

Loncaric, Sven. "A survey of shape analysis techniques." Pattern recognition 31.8 (1998): 983-1001.*

Cohen, Isaac, and Hongxia Li. "Inference of human postures by classification of 3D human body shape." Analysis and Modeling of Faces and Gestures, 2003. AMFG 2003. IEEE International Workshop on. IEEE, 2003.*

Funkhouser, Thomas, and Michael Kazhdan. "Shape-based retrieval and analysis of 3D models." ACM SIGGRAPH 2004 Course Notes. ACM, 2004.*

Ankerst, Mihael, et al. "3D shape histograms for similarity search and classification in spatial databases." International Symposium on Spatial Databases. Springer, Berlin, Heidelberg, 1999.*

Kriegel, H-P., et al. "Effective similarity search on voxelized CAD objects." Database Systems for Advanced Applications, 2003. (DASFAA 2003). Proceedings. Eighth International Conference on. IEEE, 2003.*

Belongie etal: "Shape Matching and Object Recognition Using Shape Contexts" Pattern Analysis and Machine Intelligence, IEEE Transactions on (vol. 24, Issue 4),pp. 509-522, Apr. 2002.

Johnson etal: "Using Spin Images for Efficient Object Recognition in Cluttered3DScenes"Pattern Analysis and Machine Intelligence, IEEE Transactions on (vol. 21, Issue 5), pp. 433-449, 1999.

Kim et al: "Region-based shape descriptor invariant to rotation, scale and translation"; vol. 16, Issues No. 1-2, Sep. 2000; pp. 87-93.

Kortgen etal: "3D Shape Matching with 3D Shape Contents"; Proceedings of the 7th Central European Seminar on Computer Graphics, Apr. 22-24, 2003, pp. 1-12.

Mitra etal: "Partial and approximate symmetry detection for 3D geometry"; ACM Transactions on Graphics (TOG); Proceedings of ACM SIGGRAPH 2006 SIGGRAPH '06: pp. 560-568; Jul. 30-Aug. 3, 2006.

Osada etal: "Shape Distributions"; ACM Transactions on Graphics TOG), vol. 21 Issue 4, pp. 807-832, Oct. 2002.

Sharma et al: "Shape Matching Based on Diffusion Embedding and on Mutual Isometric Consistency"; Proceedings of the 2010 IEEE Computer Society Conf.; pp. 29-36; Jun. 13-18, 2010.

Sousan et al: "Image Searching and Retrieving by invariant Shape Discriptors"; CISST '00 International Conference;CISST'2000, pp. 15-21; Jun. 26-29, 2000.

Suzuki et al: "A 3D Model Retrieval Based on Combinations of Partial Shape Descriptors"; NAFIPS 2006; pp. 273-278, Jun. 3-6, 2006.

Tangelder et al: "A Survey of Content Based 3D Shape Retrieval Methods"; Shape Modeling International, pp. 145-156; Jun. 7-9, 2004; Publisher. IEEE.

Search Report dated Mar. 7, 2013.

Tian et al., "Adaptive coding of generic 3D triangular meshes based on octree decomposition", The Visual Computer, International Journal of Computer Graphics, Springer, Berlin, vol. 28, No. 6, Apr. 2012, pp. 819-827.

Cai et al., "Exploiting repeated patterns for efficient compression of massive models", International Conference on Virtual Reality Continuum and its Applications Industry, Japan, Dec. 14, 2009, pp. 154-150.

Nishino et al., "A 3D Modeler for Aiding Creative Work Using Interactive Evolutionary Computation", The Journal of the Institute of Electronics, Information and Communication Engineers, vol. J85-D-II, No. 9, Sep. 1, 2002, pp. 1473-1483.

* cited by examiner

METHOD AND APPARATUS FOR GENERATING SHAPE DESCRIPTOR OF A MODEL

TECHNICAL FIELD

The present invention generally relates to computer graphics. In particular, the present invention relates to method and apparatus for generating shape descriptor of a model.

BACKGROUND

A 3D shape descriptor, which is usually an n dimensional vector defining the features of an entire 3D model or some part of the 3D model, is one of the basic tools in computer graphics technology. The 3D shape descriptor is widely used in many 3D model processing tasks, such as searching, symmetry discovery and modeling.

MITRA, N. J., GUIBAS, L. J., and PAULY, M. 2006, "Partial and approximate symmetry detection for 3D geometry", ACM Trans. Gr. 25, 3, 560.568 proposes to uses the ratio of the curvature tensors at the sample points as the shape descriptor of sample points.

To improve the discriminative performance, a number of shape descriptors have been proposed. The following documents discussed some examples of known 3D shape descriptors:

(1) 3D shape contexts, M. Kortgen, G.-J. Park, M. Novotni, and R. Klein, "3D Shape Matching with 3D Shape Contexts", the 7$^{th}$ Central European Seminar on Computer Graphics, 2003.
(2) Spin images, A. E. Johnson and M. Herbert, "Using Spin Images for Efficient Object Recognition in Cluttered 3D Scenes", IEEE Trans. on PAMI, 21(5), pp. 433-449, 1999.
(3) Shape distributions, R. Osada, T. Funkhouser, B. Chazelle, and D. Dobkin, "Shape Distributions", ACM Trans. on Graphics, 21(4), pp. 807-832, 2002.

The shape context described in the above document (1) applies a natural extension of 2D shape context proposed in S. Belongie, J. Malik and J. Puzicha, "Shape Matching and Object Recognition Using Shape Contexts", IEEE Trans. on PAMI, 24(4), pp. 509-522, 2002 for 3D shape retrieval and matching, which is defined at a reference point capturing the distribution of the remaining points relative to it. The spin image described in the above document (2) is a data level shape descriptor that is represented as a 2D histogram. These two approaches of the documents (1) and (2) are based on the statistics of local point-sampled geometry, which are appropriate for a variety of shape representations, such as meshes, polygon soups, and oriented point clouds.

Shape distribution described in the above document (3) is a representative global shape descriptor, wherein the signature of an object is represented as a shape distribution sampled from a shape function measuring global geometric properties of an object. There are challenges for this approach on how to select discriminating shape functions and how to develop efficient methods for sampling them. In J. W. H. Tangelder, R. C. Veltkamp, "A Survey of Content Based 3D Shape Retrieval Methods", Shape Modeling International, pp. 145-156, 2004, a variety of global/local shape descriptors are reviewed for the task of 3D model retrieval.

Figure 1:
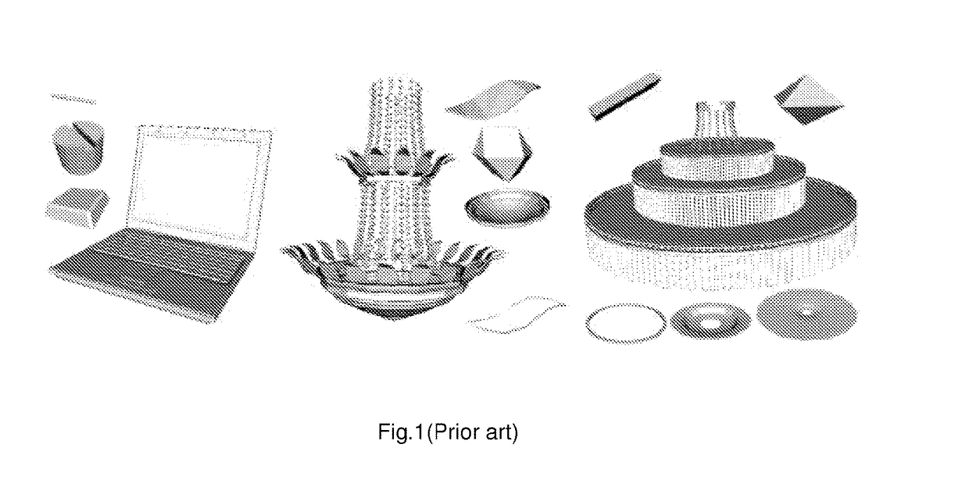
FIG. 1 is a diagram showing examples of non-watertight 3D models.

However, most of the current algorithms for calculating 3D shape descriptors are designed for watertight 3D models, i.e. 3D models with smooth surface and dense vertex distribution. The examples of non-watertight 3D models are shown in FIG. 1. These algorithms are not suitable for non-watertight 3D models, those 3D models with sharp features and sparse vertex distribution, such as architectural and mechanical CAD models. And some applications, such as real-time 3D model searching, need a fast algorithm for calculating 3D shape descriptors.

Therefore, there is a need for a method and apparatus for generating shape descriptor of 3D model, which is efficient for non-watertight 3D models.

SUMMARY OF INVENTION

According one aspect of the invention, a method for generating an n dimensional vector as a shape descriptor of a mode is provided. The method comprises: determining a type element of the vector to describe the basic shape of the model; and calculating n−1 metric elements of the vector, each of which represents the percentage of all of a feature of the model falling into one of n−1 layers divided as a function of the type element.

According another aspect of the invention, an apparatus for generating an n dimensional vector as a shape descriptor of a model is provided. The apparatus comprises: means for determining a type element of the vector to describe the basic shape of the model; and means for calculating n−1 metric elements of the vector, each of which represents the percentage of all of a feature of the model falling into one of n−1 layers divided as a function of the type element.

According another aspect of the invention, a shape descriptor of a model is provided. The shape descriptor is an n dimensional vector and comprises: a type element for describing the basic shape of the model; and n−1 metric elements of the vector, each of which represents the percentage of all of a feature of the model falling into one of n−1 layers divided as a function of the type element.

It is to be understood that more aspects and advantages of the invention will be found in the following detailed description of the present invention.

BRIEF DESCRIPTION OF THE DRAWINGS

The accompanying drawings are included to provide further understanding of the embodiments of the invention together with the description which serves to explain the principle of the embodiments. The invention is not limited to the embodiments.

In the drawings.

DETAILED DESCRIPTION

An embodiment of the present invention will now be described in detail in conjunction with the drawings. In the following description, some detailed descriptions of known functions and configurations may be omitted for conciseness.

According to an embodiment of the invention, a method for generating a shape descriptor of a 3D model with a low complexity are provided, which are robust and can process non-watertight 3D models effectively. The embodiment of the invention can be used for 3D modeling and symmetry discovery mesh simplification, wherein multi-scale repetitive structures detected on an input mesh can be preserved at different levels of detail.

In the method according to the embodiment of the invention, an n dimensional vector was generated as the shape descriptor to define the shape of a 3D model. In the embodiment of the invention, an 11 dimensional vector will be described. That is, the vector of the 3D shape descriptor contains 11 elements. However, a person skilled in the art can appreciate that n could be any integer numbers. More accuracy for the purpose of shape description is expected for a vector with larger dimensions.

According to the embodiment of the invention, one of the 11 elements of the vector is determined to describe the basic shape of the 3D model, which can be called the type element. The basic shape set of a 3D model is known in the art and can be set according to the context of the invention. In one example, the basic shape set comprises cube, sphere and cylinder. In another example, the basic shape set can comprises plane, open cylinder (cylinder without bottom and top), cylinder, ellipse and sphere.

The type element can be an integer, for example, 0 for cube, 1 for sphere and 2 for cylinder; or 0 for plane, 1 for open cylinder, 2 for cylinder, 3 for ellipse, 4 for sphere.

The type element of a 3D model can be calculated according to the three eigenvalues of the covariance matrix of the 3D model. For example, for the basic shape set comprising cube, sphere and cylinder, the type element can be calculated as follows:

If the three eigenvalues have obvious differences, i.e. the second biggest value is less than 95% of the biggest value and the smallest value is less than 95% of the second one, the type element is set to 0, i.e. cube.

If only two values are close enough, i.e. one is in 95% of the other one, the type element is set to 1, i.e. cylinder.

For the other case, the three values are close enough and the type element is set to 2, i.e. sphere.

Next, the other 10 elements of the vector are determined to represent the percentage of all of a feature on the bounding box of the 3D model falling into different layers divided according to the type element, each of which is called the metric vector element. The feature of the 3D model can be a vertex, a triangle or an edge of the 3D model.

The metric vector element can be all floats, which can be calculated as follows.

Next, an example for determining the metric vector elements of the vector with all vertices on the bounding box of the 3D model will be described in details.

Figure 2:
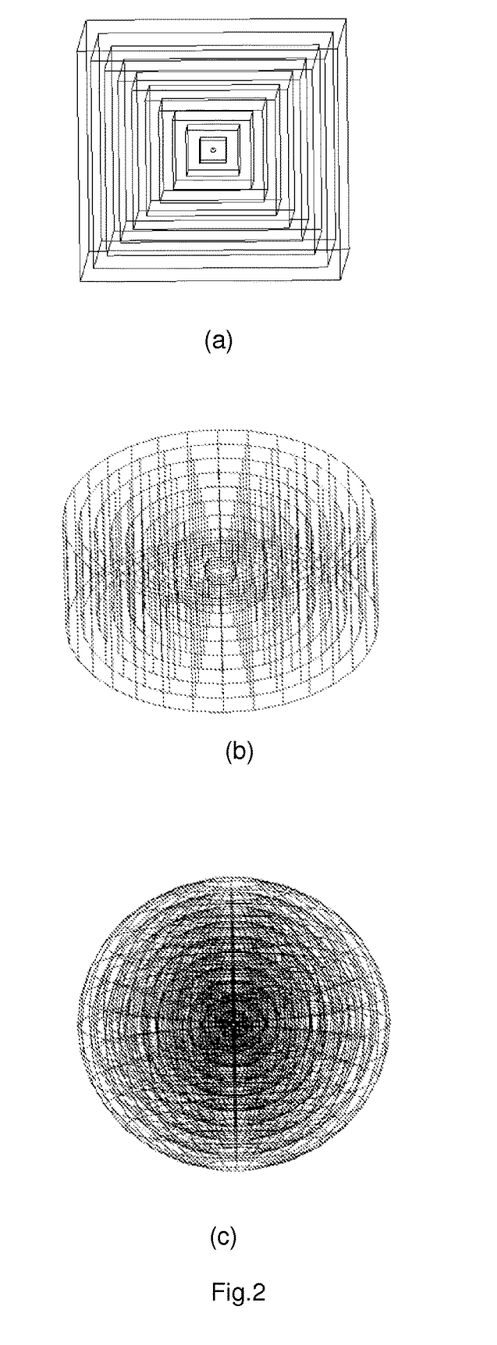
FIG. 2 is a diagram showing the dividing of the bounding box of the 3D model according to the type element.

After model normalization, the bounding box of the 3D model can be divided into 10 layers according to the type element. FIG. 2 is a diagram showing the dividing of the bounding box of the 3D model according to the type element.

(i) For cube, ten embedded cubes are used to divide the 3D model bounding box. All the cubes have the same centre, i.e. the 3D model centre. The length of the cube are 0.1, 0.2, . . . , 1, which means one is included by another.

(ii) For cylinder, ten embedded cylinders are used to divide the 3D model bounding box. The height of the cylinders are 0.1, 0.2, . . . , 1, and the radius of the undersurface are 0.05*sqrt(2), 0.1*sqrt(2), 0.15*sqrt(2), . . . , 0.5*sqrt(2). All the cylinders have the same centre, i.e. the 3D model centre.

(iii) For sphere, ten embedded spheres are used to divide the 3D model bounding box. The radius of the sphere are: 0.05*sqrt(2), 0.1*sqrt(2), 0.15*sqrt(2), . . . , 0.5*sqrt(2). All the spheres have the same centre, i.e. the 3D model centre.

After the division of the 3D model bounding box, the vertices falling into different layers are counted and the initial metric vector elements are calculate. The final metric vector is obtained by normalization.

Figure 3:
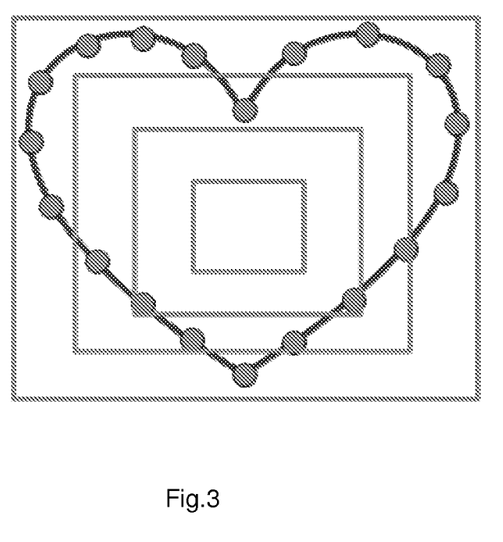
FIG. 3 is a diagram showing the process for calculating of the metric vector element s of a 2D shape.

FIG. 3 is a diagram showing the process for calculating of the metric vector element s of a 2D shape.

A heart-like shape is shown in FIG. 3. The bounding box is rectangle-like. The type element for the shape can be set, for example, to be 1 (for rectangle). Suppose a 5 dimensional vector is used as the shape descriptor of the 2D shape, that is, 4 metric vector elements are needed, then the bounding box is divided by 4 rectangles with the same center and decreasing scale as shown in the FIG. 3. As shown in FIG. 3, there are totally 19 vertices on the bounding box of the heart-like shape (indicated by black dots). And there are 12 (63.2%), 5 (26.3%), 2 (10.5%), 0 vertices falling into the four layers. Thus the vector shape descriptor for the heart-like shape is (1, 0.632, 0.263, 0.105, 0.0).

The calculation of the metric vector element is described in the context of a 2D shape for illustrative purpose. It is appreciated by a person skilled in the art that the process for a 3D model is similar.

The similarity between two models can be quantitative calculated as follows:

(1) If the two shape elements are not equal, the similarity between the two 3D models is 0.

(2) If the shape elements are equal, the Euclidian Distance of the two metric vectors is computed. Suppose the distance is d, then the similarity between the two 3D models is 1/d.

Another embodiment of the invention provides a corresponding apparatus for generating an n dimensional vector as a shape descriptor of a 3D model. The apparatus comprises means for determining a type element of the vector to describe the basic shape of the 3D model; and means for calculating n−1 metric elements of the vector, each of which represents the percentage of all of a feature of the 3D model falling into one of n−1 layers divided as a function of the type element.

A further embodiment of the invention provides a corresponding shape descriptor of a 3D model. The shape descriptor is an n dimensional vector, which comprises: a type element for describing the basic shape of the 3D model; and n−1 metric elements of the vector, each of which represents the percentage of all of a feature of the 3D model falling into one of n−1 layers divided as a function of the type element.

Next, the application of the 3D shape descriptor calculated according to the method of the embodiment of the invention will be described in the context of 3D modeling and repetitive structure discovery.

It is a complex and time consuming task for constructing a complex 3D model. Based on the symmetry discovery result of an existing 3D model, some patterns can be replaced to generate a new 3D model. However, the pattern replacement is bothering since it needs to repair all the repetitive parts of the model to make the generated model reasonable. Next, a method for constructing a 3D model using the 3D shape descriptor calculated according to an embodiment of the invention will be described.

According to the method for constructing a 3D model, by analyzing the structure of an existing model, all the repetitive structures of the 3D model are obtained and a suitable model is selected from the library to replace some patterns to generate a new 3D model.

Figure 4:
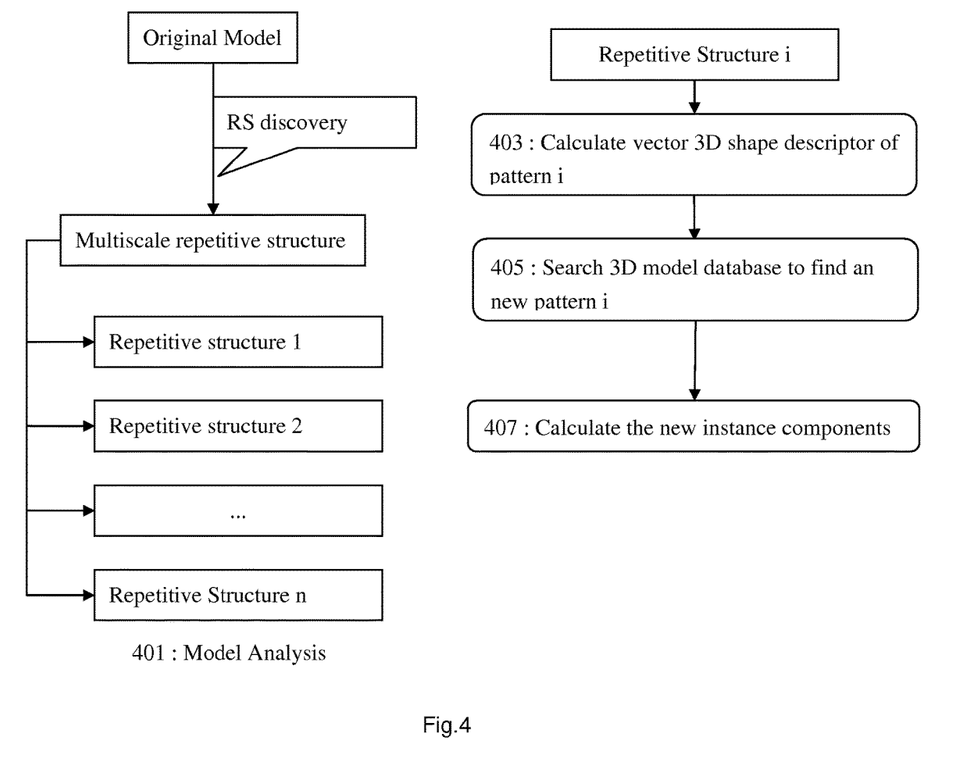
FIG. 4 is a block diagram showing the flowchart of a method for constructing a 3D model with the 3D shape descriptor calculated according to an embodiment of the invention.

FIG. 4 is a block diagram showing the flowchart of a method for constructing a 3D model with the 3D shape descriptor calculated according to an embodiment of the invention.

At block 401, the multi-scale repetitive structures (RS) of an original model are detected.

For purpose of the multi-scale repetitive structures detection of the original model, the method described in the international patent application PCT/CN2010/000984, Kangying Cai et al, "Method and apparatus for detecting repetitive structures in 3D mesh models" can be used. According to PCT/CN2010/000984, an efficient and multi-scale method has been proposed to detect repetitive structures in 3D models, wherein an iterative uniform sampling method with a decreasing sampling step size is used. A given 3D mesh model is uniformly sampled with an initial sampling step size, which is relatively large. Then, the sampling points are clustered according to their curvature, and then transformations are determined between sampling points that belong to the same cluster. These are so-called candidate transformations. Thus, the candidate transformations need to be determined only for those sampling point pairs where both points have similar curvature. Such clustering step not only improves the algorithm efficiency, but also increases the algorithm accuracy. The transformation space, which is constructed by all the transformations calculated before, contains less noise elements than it would if the sampling step size was smaller. Thus, a subsequent clustering step will be more likely to discover all the repetitive structures. If the model comprises repetitive structures, the usual result of such clustering is that one or more distinct clusters will emerge. In the next step, the (most relevant) clusters are selected, and the corresponding transformations and sampling point pairs are assumed to indicate a repetitive structure. The most relevant clusters are those which are most significant and apparent. Other transformations that don't belong to a cluster are discarded. This procedure is iteratively executed with a decreasing sampling step. Each iteration skips repetitions, and only processes remaining parts of the model and representatives of the representative structures that were detected in the previous iteration. Thus, also multi-scale repetitive structures on the 3D model can be discovered. The iterative process stops when the number of repetitive structures is stable, or when a pre-defined minimum sampling step size is reached. It is also possible to define a time-out, measure the runtime of the process, and terminate the process when the runtime exceeds the time-out. Based on the foregoing, a multi-scale repetitive structures detection of the input model mesh model M can be achieved by PCT/CN2010/000984, the result of which can be used in the embodiment of the present invention.

As shown in block 401 of FIG. 4, multi-scale repetitive structures 1, n of an original model are detected. Based on the repetitive structures detected in the original model, the local repetitive parts can be replaced with similar objects to generate new models, as shown in the right part of the FIG. 3.

At block 403, the vector 3D shape descriptor of pattern i is calculated. Firstly, the orientation of pattern i is aligned with the world coordinate system and then scaled to a unit cube. Then the vector 3D shape descriptor of the aligned pattern I is calculated.

At block 405 a 3D database is searched to find a new pattern i. Besides the 3D models, the vector 3D shape descriptors of the 3D models are also available in the 3D database. By comparing the vector 3D shape descriptors, the new patterns from the 3D database which are most similar with the old ones can be found.

At block 407 the new instance components are calculated. The new patterns are first transformed to have the same position, orientation and scaling factors of the corresponding old ones calculated by block 401. Then the new instances are calculated from the new patterns after transformation and original instance transformation.

Figure 5:
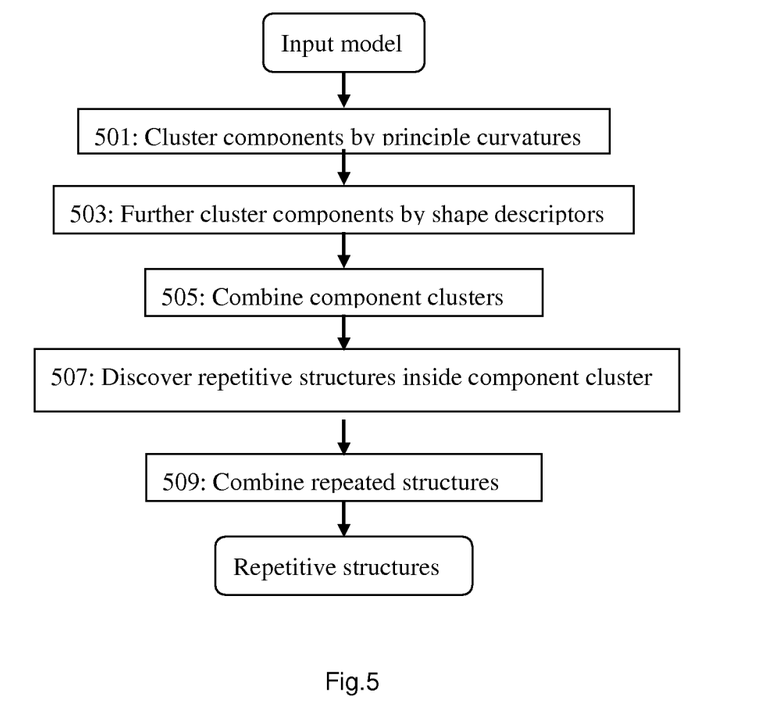
FIG. 5 is a block diagram showing the flowchart of a method for discovering repetitive structures among the connected components of an input multi-component 3D model with the 3D shape descriptor calculated according to an embodiment of the invention.

FIG. 5 is a block diagram showing the flowchart of a method for discovering repetitive structures among the connected components of an input multi-component 3D model with the 3D shape descriptor calculated according to an embodiment of the invention.

As shown in FIG. 5, at block 501 all components clustered according to their principle curvatures. Known clustering methods in the art can be used in this step.

At block 503 the components inside one resultant component cluster of block 401 are further clustered according to their shape descriptors. Known clustering methods in the art can be used in this step.

At block 505 the resultant component clusters of block 503 are combined. If the representative components of two component clusters belong to the same repetitive structure, then the two component cluster will be combined. The detail algorithm can be as follows:

```
void Combine_Component_Cluster(void)
{
    Calculate the distances of all representative component pairs;
    Sort all representative component pairs according to their distances in increasing order;
    For (each sorted representative component pairs)
    {
    Align the two representative components;
    Calculate the distance between the two representative components;
    If(Representative component distance < Threshold)
        Combine the corresponding two component clusters;
    else
        break;
    }
}
```

The distance between two components is calculated as follows.

Component_Distance=$a$*component_principle_curvature_distance+$b$*component_shape_descriptor_distance where a and b are user specified constants.

At block 507 repetitive structures inside each component clusters discovered. Each component will be compared with the representative component of the component cluster it belongs to in order to decide whether they belong to the same repetitive structure. The detail algorithm can be as follows:

```
void Discover_Repetitive_Structure_Inside_Component_Cluster (void)
{
    For(each component cluster Cluster_i)
    {
        For (each component c belonging to Cluster_i)
        {
        Align c and Repre_i, the representative component of Cluster_i;
        Calculate the distance between c and representative
```

```
component of Cluster_i;
        If(Component distance < Threshold)
            Add c to the repetitive structure Repre_i
            belonging to;
        else
            Add a new repetitive structure and add c to the
new repetitive structure;
        }
    }
}
```

At block 509 the resultant repetitive structures of block 501 are combined. If the representative components of two component clusters are similar, then the two component cluster will be combined.

Although the invention is described in the context of a 3D model, a person skilled in the art can appreciate that the invention can also be applied into a 2D shape.

The invention claimed is:

1. A computer implemented method for generating an n dimensional vector as a shape descriptor of a non-watertight three-dimensional (3D) model, comprising:
   determining, as a function of three eigenvalues of a covariance matrix of the non-watertight 3D model, a type element of the vector to describe a basic shape of the model, wherein the type element is a first dimension in the vector;
   determining a feature of the non-watertight 3D model and a total number of features in the non-watertight 3D model;
   generating n−1 metric elements of the vector, each of the n−1 metric elements represents all of the feature of the non-watertight 3D model falling into one of n−1 layers divided as a function of the type element per the total number of features in the non-watertight 3D model; and
   performing a search for the non-watertight 3D model using the vector which can effectively process non-watertight 3D models.

2. The method according to claim 1, wherein the feature comprises a vertex, a triangle, or an edge of the non-watertight 3D model.

3. The method according to claim 1, wherein the basic shape of the non-watertight 3D model comprises cube, sphere and cylinder.

4. The method according to claim 1, wherein the type element is an integer.

5. The method according to claim 1, wherein a bounding box of the non-watertight 3D model is divided by n−1 embedded shape determined according to the type element.

6. The method according to claim 5, wherein one of the metric elements is calculated by a normalization of a percentage of all of a feature of the non-watertight 3D model falling into one of n−1 layers.

7. The method according to claim 1, wherein the metric elements are all floats.

8. Apparatus for generating an n dimensional vector as a shape descriptor of a non-watertight three-dimensional (3D) model, comprising:
   a processor for determining, as a function of three eigenvalues of a covariance matrix of the non-watertight 3D model, a type element of the vector to describe the basic shape of the model, wherein the type element is a first dimension in the vector, said processor further configured to;
   determine a feature of the non-watertight 3D model and a total number of features in the non-watertight 3D model;
   the processor is further used to generate n−1 metric elements of the vector, each of the n−1 metric elements represents all of the feature of the non-watertight 3D model falling into one of n−1 layers divided as a function of the type element per the total number of features in the non-watertight 3D model; and
   the processor is further used to perform a search for the non-watertight 3D model using the vector which can effectively process non-watertight 3D models.

9. The apparatus according to claim 8, wherein the processor is used further for dividing a bounding box of the non-watertight 3D model with n−1 embedded shapes, the n−1 embedded shapes being determined according to the type element.

10. The apparatus according to claim 8, wherein the processor is used further for determining one of the metric elements with a normalization of a percentage of all of a feature of the non-watertight 3D model falling into one of the n−1 layers.

* * * * *